United States Patent Office 3,424,006
Patented Jan. 28, 1969

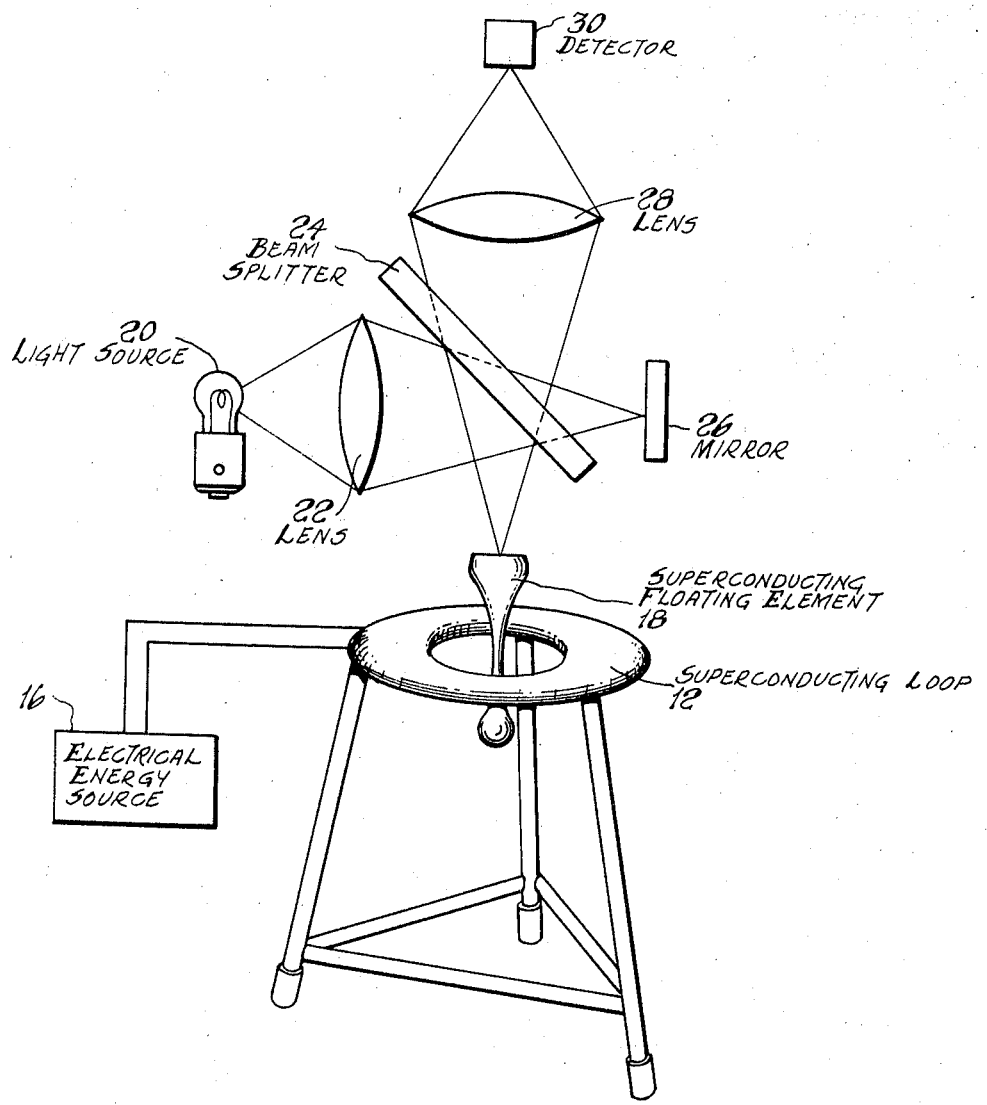

3,424,006
SUPERCONDUCTING GRAVIMETER
Robert H. Dicke, Princeton, N.J., and Barry Block, Seat Pleasant, and Joseph Weber, Chevy Chase, Md.; said Dicke and said Block assignors to the United States of America
Filed July 30, 1965, Ser. No. 475,990
U.S. Cl. 73—382
Int. Cl. G01m 1/12
4 Claims This invention relates to instruments for detecting the influence of gravity and especially to an instrument of this nature which utilizes the principle of superconduction.

Previously, instruments for measuring the influence of gravity have usually been made by suspending a weight from a spring and using optical means to magnify and measure any change in displacement of the weight. However, with this type of set-up, it is impossible to keep the instrument zeroed because the spring suffers from plastic flow. Also, the instrument is inherently inaccurate because of temperature sensitivity, since the spring constant is a function of temperature.

These inaccuracies can be minimized by the use of proper materials such as fused quartz. However, it is possible to do even better by eliminating a material spring entirely.

The objects and advantages of the present invention are accomplished by using a magnetic suspension instead of a spring suspension and by using magnetism under the conditions of the superconductive rather than the normal state. A typical embodiment of the invention employs a floating superconducting element supported by the magnetic field produced by current flowing through a superconductive loop or coil. Changes in the displacement of the floating element are detected optically by suitable means such as an interferometer.

An object of this invention is to provide an instrument adapted to detect changes in gravity.

Another object is to minimize plastic flow and temperature sensitivity in an instrument for detecting the influence of gravity.

Other objects and many of the attendant advantages of this invention will be readily appreciated as the same becomes better understood by reference to the following detailed description when considered in connection with the accompanying drawings wherein:

The single figure is a schematic representation of a preferred embodiment of the invention.

The invention comprises a conductive loop 12 capable of carrying an electric current. The loop 12 may be a coil of wire the plane of which is horizontal as shown. The loop 12 is supported by any suitable support means such as a tripod 14. The loop 12 can be connected to a source of electrical energy 16 when current flow through the loop is desired. The loop 12 may be considered to be magnetic suspension means.

The suspended element, or the floating element, 18 may be a substantially dumbbell-shaped element which is truncated at its upper end (if the dumbbell is viewed in a vertical position). The truncated end is ground flat and aluminized so that its possesses a mirror finish. The floating element is a gravity element, an element which exhibits changes in positional displacement in response to changes in the force of gravity acting upon it. The floating element is fabricated from a material which is superconducting below a critical temperature.

The apparatus shown above the floating element 18 comprises means for detecting and perhaps measuring the positional displacements of the floating element 18 in response to changes in gravity. The apparatus may, for example, consist of an interferometer having a light source 20, a condensing lens 22, a beam splitter 24, a mirror 26, a second condensing lens 28 and a detector 30 for measuring the distance the floating element 18 has moved in terms of the wavelength of the light. The use of interferometers for this purpose is well-known and will not be elaborated upon any further.

In operation, the loop 12 and the floating element 18 are cooled to a temperature at which they are superconducting and a constant current flow is started in the loop 12. Once the current is started, the loop 12 can be disconnected from the source 16 and the current in the loop will remain constant because there is no resistance in the superconducting state. The floating element 18 is then placed in position as shown with its truncated end above the plane of the loop 12. It will float or hang suspended there, being supported by the magnetic field of the loop 12. This results from the fact that a superconductor with no flux frozen inside itself acts as a perfect diamagnet. Its ultimate position depends on the strength of the gravity field and the strength of the magnetic field.

If the strength of the gravity field changes, the vertical position of the floating element 18 shifts or in other words, a vertical positional displacement takes place which is detectable by the interferometer.

As previously mentioned, this invention has certain advantages. For example, the current through the superconducting loop, and therefore the spring constant, is independent of the temperature provided it is below a critical temperature which is characteristic of the material used. Thus, the "effective spring" of the system has no temperature sensitivity.

Also, because the flux is frozen in the system, there are no "plasticity drifts." An electric field servo can be used to make this a null reading instrument in a manner similar to the Worden type gravimeters now in use at Princeton University.

It should be noted that the invention may also be employed as the basis for a seismograph and for an accelerometer.

Obviously many modifications and variations of the present invention are possible in the light of the above teachings. It is therefore to be understood that within the scope of the appended claims the invention may be practiced otherwise than as specifically described.

We claim:
1. Apparatus for measuring gravitational or acceleration forces comprising, in combination:
   a loop made of a material which becomes superconducting when its temperature is below a critical level, said loop being orientated so that it is in a horizontal plane and its axis is vertical;
   a sensing element made of a material which becomes superconducting when its temperature is below a critical level;
   said loop and said sensing element being cooled to a temperature below their critical levels whereby both said loop and said sensing element are in a superconducting state;
   means for establishing a circulating current of constant amplitude around said loop when said loop is in said superconducting state, whereby a substantially constant magnetic field is produced in the vicinity of said loop;
   said sensing element when in said superconducting state acting as a diamagnet so that, when disposed within the magnetic field produced by said loop, said sensing element remains suspended at an initial reference position; and
   means for detecting subsequent changes in the position of said sensing element thereafter brought about by acceleration or gravitational forces acting on it.

2. In an arrangement as defined in claim 1 wherein said means for detecting subsequent changes in the position of said sensing element comprises an interferometer.

3. In an arrangement as defined in claim 1
wherein said sensing element has a portion thereof which is flat and light reflective; and
wherein said means for detecting subsequent changes in the position of said sensing elements includes an optical detector which employs light reflected from said flat portion.

4. In an arrangement as defined in claim 1 wherein said means for detecting subsequent changes in the position of said sensing element comprises:
an interferometer which employs in its operation the reflection of a light beam of a predetermined wave length from a portion of said sensing element.

References Cited

UNITED STATES PATENTS

| | | | |
|---|---|---|---|
| 2,675,222 | 4/1954 | Clark | 73—382 X |
| 2,691,306 | 10/1954 | Beams et al. | 73—382 X |
| 2,856,240 | 10/1958 | Breazeale et al. | 73—382 X |
| 3,066,255 | 11/1962 | Westphal | 73—382 X |

RICHARD C. QUEISSER, *Primary Examiner.*

C. T. McCLELLAND, *Assistant Examiner.*